(12) United States Patent
Jerke

(10) Patent No.: US 7,971,410 B2
(45) Date of Patent: Jul. 5, 2011

(54) HURRICANE FRAMING TIE

(75) Inventor: Alvin Jerke, Middleton (CA)

(73) Assignee: Alvin Jerke, Nova Scotia (CA)

( * ) Notice: Subject to any disclaimer, the term of this patent is extended or adjusted under 35 U.S.C. 154(b) by 0 days.

(21) Appl. No.: 12/172,689

(22) Filed: Jul. 14, 2008

(65) Prior Publication Data
US 2009/0178362 A1 Jul. 16, 2009

(30) Foreign Application Priority Data
Jul. 18, 2007 (CA) ..................................... 2593955

(51) Int. Cl.
E04B 1/38 (2006.01)
E04C 5/00 (2006.01)
(52) U.S. Cl. .............................. 52/702; 52/703; 52/704
(58) Field of Classification Search ............ 52/702–704, 52/655.1, 298, 241
See application file for complete search history.

(56) References Cited

U.S. PATENT DOCUMENTS

| 2,477,163 | A | | 7/1949 | Barnett | |
| 2,911,022 | A | * | 11/1959 | Brown | 269/40 |
| 3,256,030 | A | | 6/1966 | Banse | |
| 3,967,908 | A | * | 7/1976 | Snow et al. | 403/219 |
| 4,625,415 | A | * | 12/1986 | Diamontis | 33/613 |
| 4,714,372 | A | | 12/1987 | Commins | |
| 5,230,198 | A | * | 7/1993 | Callies | 52/702 |
| 5,481,844 | A | | 1/1996 | Kajita | |
| 5,603,580 | A | | 2/1997 | Leek et al. | |
| 6,837,019 | B2 | | 1/2005 | Collie | |
| 6,922,967 | B2 | * | 8/2005 | Collie | 52/656.9 |
| 6,931,813 | B2 | * | 8/2005 | Collie | 52/713 |
| 7,310,914 | B1 | * | 12/2007 | Moore | 52/92.2 |

* cited by examiner

Primary Examiner — Richard E Chilcot
Assistant Examiner — Mark R Wendell
(74) Attorney, Agent, or Firm — Marsh Fischmann & Breyfogle LLP

(57) ABSTRACT

A unitary framing tie is provided for use in securing framing members in wood framed construction. The tie comprises a generally U-shaped base having: a pair of longitudinally spaced apart coplanar plates; a pair of substantially parallel, opposed flanges depending downwardly from the plates; and a pair of substantially parallel, opposed sidewalls extending upwardly from the plates. In operation, the tie provides an apparatus capable of securing two framing ties together bilaterally, which may be installed before or after the framing members are affixed together.

13 Claims, 4 Drawing Sheets

HURRICANE FRAMING TIE

FIELD OF THE INVENTION

The present invention relates to the field of hurricane framing ties used in the construction of wood framed buildings. More specifically, the present invention relates to hurricane framing ties that can securely affix two wooden framing members together, thereby reducing the impact of high wind conditions, such as hurricanes or tornadoes, on wood construction buildings.

BACKGROUND OF THE INVENTION

Wood frame construction is a commonly used method for building homes and apartments, as well as commercial and industrial structures. The continued use of wood framed buildings over time, and in a variety of climates, endorses the inherent strength and durability of wood construction. This durability is due, in part, to building codes which have progressively become more comprehensive, often requiring more rigorous designs and methodologies than those associated with conventional construction. Along with improved building codes, the use of new tools and equipment on construction sites continues to enforce the stability of wood frame construction.

Despite these improvements, however, wood framed construction is being subjected to more and more extreme weather conditions. High winds, tornadoes and earthquakes are becoming more commonplace all over the globe. Wooden structures are not always constructed with sufficient strength to withstand the impact. As a result, wood frame buildings are more susceptible, and can incur severe structural damage. This increased susceptibility to damage translates to a greater risk of injury or death to the occupants inside. Industry standards must be developed, along with the use of new frame-strengthening tools, to ensure that building structures, particularly those of wooden construction, are sufficiently sturdy to withstand strong wind or seismic forces providing greater safety for the occupants inside.

Typical hurricane framing ties are designed to secure wooden roof rafters and trusses to horizontal wall joists. In one known embodiment, described in U.S. Pat. No. 4,714,372, the tie connects wood framing members by affixing to one side of each member, and comprises:
- a unitary base member, having an area dimensioned for, and pierced by, a plurality of nail holes for fastening the base member to the planar surface of a first framing member; and
- a right angled web member, joined to and relatively larger than the base member, also having an area dimensioned for, and pierced by, a plurality of nail holes for fastening the web member to the edge face surface of a second framing member, whereby the second framing member is supported by, and is perpendicular to, the first framing member.

In order to secure the two framing members from both sides, such that both multi-directional forces imposed upon the members is uniformly decreased, two of these hurricane ties must be used in conjunction with each other and placed on both sides of the framing members.

In yet another embodiment, described in U.S. Pat. No. 5,481,844, a process is described for improving the strength of wood construction buildings exposed to cold temperatures. The patent discloses a connector joint part assembly, having two separate components, for connecting together wooden beams. The connector joint part assembly comprises:

1) A Base Assembly Having:
   - a C-shaped joint part assembly having opposing sidewalls with top and bottom edges, wherein the opposing side walls are sufficiently spaced to receive the end of a first framing beam, and,
   - L-shaped side flanges, having shorter and longer flanges, wherein the longer flange extends perpendicularly from the bottom edge of the opposing sidewalls, and the shorter flange extends downward from the longer flange.

The L-shaped side flanges are positioned to receive a second wooden framing beam, such that when the end of the first framing beam is placed within the C-shaped assembly, the first beam rests perpendicular to the second beam (or crossbeam); and, 2) a plate member with a long bolt, to be used in conjunction with the C-shaped joint part assembly, such that the plate member is fastened to the bottom surface of the first framing beam, and the bolt is threaded into a side surface of the second wooden crossbeam.

The use of a connector joint part in conjunction with a long bolt improves the reduction of lateral forces; however, the two separate pieces require that the worker take an extra step, and more time, to securely affix the two crossbeams.

There is a need in the construction industry for a unitary hurricane framing tie that is capable of securing wooden framing members together from both sides to better withstand the effects of extreme weather conditions. It is further desirable to provide a hurricane framing tie for securing adjacent wooden members forming a joint configuration, for example between roof rafters and trusses, which is easily installed and reduces the impact of multi-directional wind and/or seismic forces.

SUMMARY OF THE INVENTION

The present invention relates to a hurricane framing tie for use in the construction of wood framed buildings. The tie is designed with the objective of connecting wooden framing members so that they better withstand the impact of high wind or earthquake conditions.

The framing tie is a unitary structure. It comprises a generally U-shaped base, formed by a pair of longitudinally spaced apart, coplanar plates and a pair of downwardly depending side flanges, the first of which is continuous and connects to the coplanar plates. The coplanar plates are spaced apart longitudinally and define a first gap. The second side flange is also spaced apart, and defines a second gap aligned with the first gap. The combination of gaps provides means for introducing the tie into place after the framing members are affixed together. The base, therefore, forms an open-ended three-sided first channel for receiving a wooden first framing member, such as a wall plate.

A pair of parallel, opposing, transverse flanges extend upwardly from the base along the edges of the first gap. The transverse flanges form the opposing sidewalls of an open-ended, open-bottomed second channel, aligned with the first gap, for receiving the edge of a wooden second framing member, such as a joist.

As a consequence of providing the structure described:
- the base can fit over a wall plate, which can extend through the open-ended first channel, and nails may be driven non-obliquely into the wall plate through the tie from three sides; and
- a joist can drop into the second channel, make contact with the wall plate, and nails may be driven non-obliquely into the joist through the tie from two sides;

thereby securely affixing the two framing members together bilaterally.

As a result of providing alignment of the first and second gaps, the framing tie is adapted to be mounted to the framing members after the framing members have been affixed together.

Broadly stated, the present invention is concerned with a unitary framing tie for use in securing framing members in wood framed construction. The tie comprises a U-shaped base having a pair of longitudinally spaced apart coplanar plates with side, central and terminal edges, wherein the central edges define a first gap. A pair of substantially parallel, opposed flanges depend downwardly from the side edges, such that the base defines an open-ended three-sided first channel for receiving a first framing member. One flange is continuous, joining the coplanar plates, and the other flange forms a second gap in alignment with the first gap. The tie further comprises a pair of substantially parallel, opposed sidewalls extending upwardly from the first gap along the central edges of the plates to form an open-ended second channel to receive a second framing member.

DESCRIPTION OF THE PREFERRED EMBODIMENT

Figure 1:
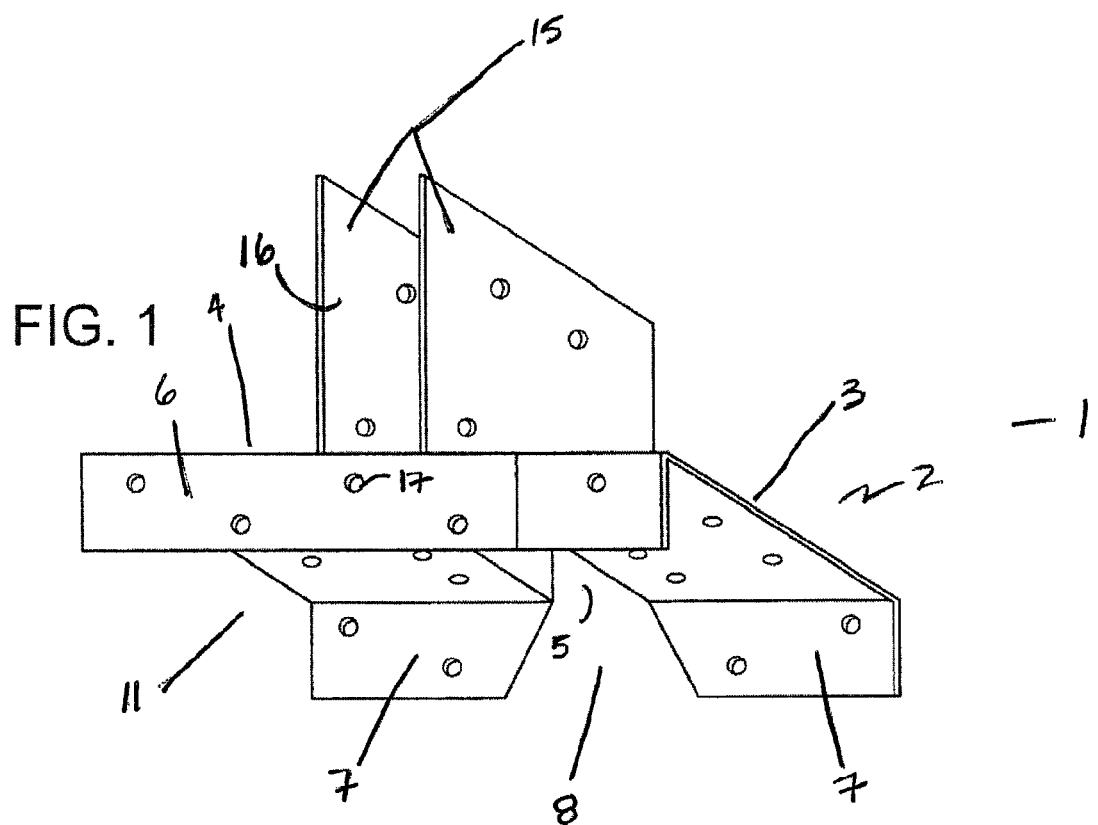
FIG. 1. is a side-bottom view of the framing tie.
Figure 2:
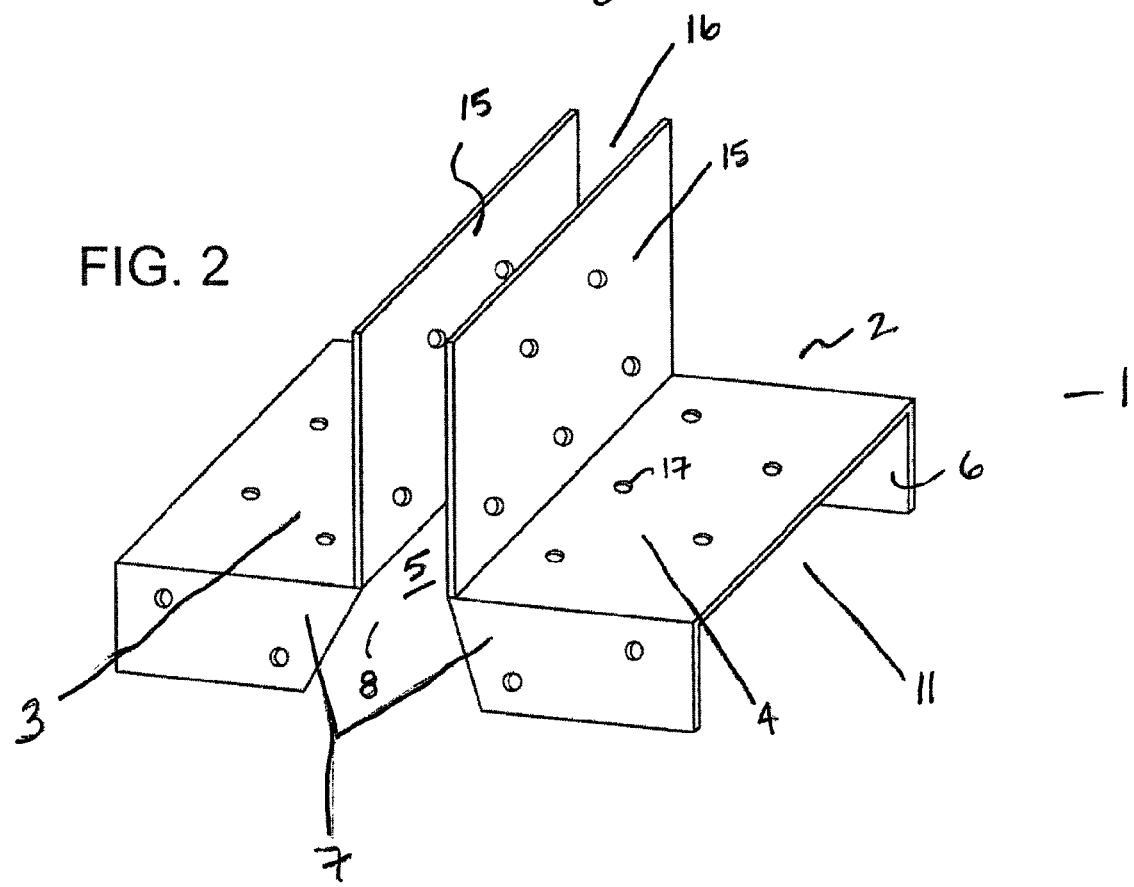
FIG. 2. is a side-elevational view of the framing tie.
Figure 3:
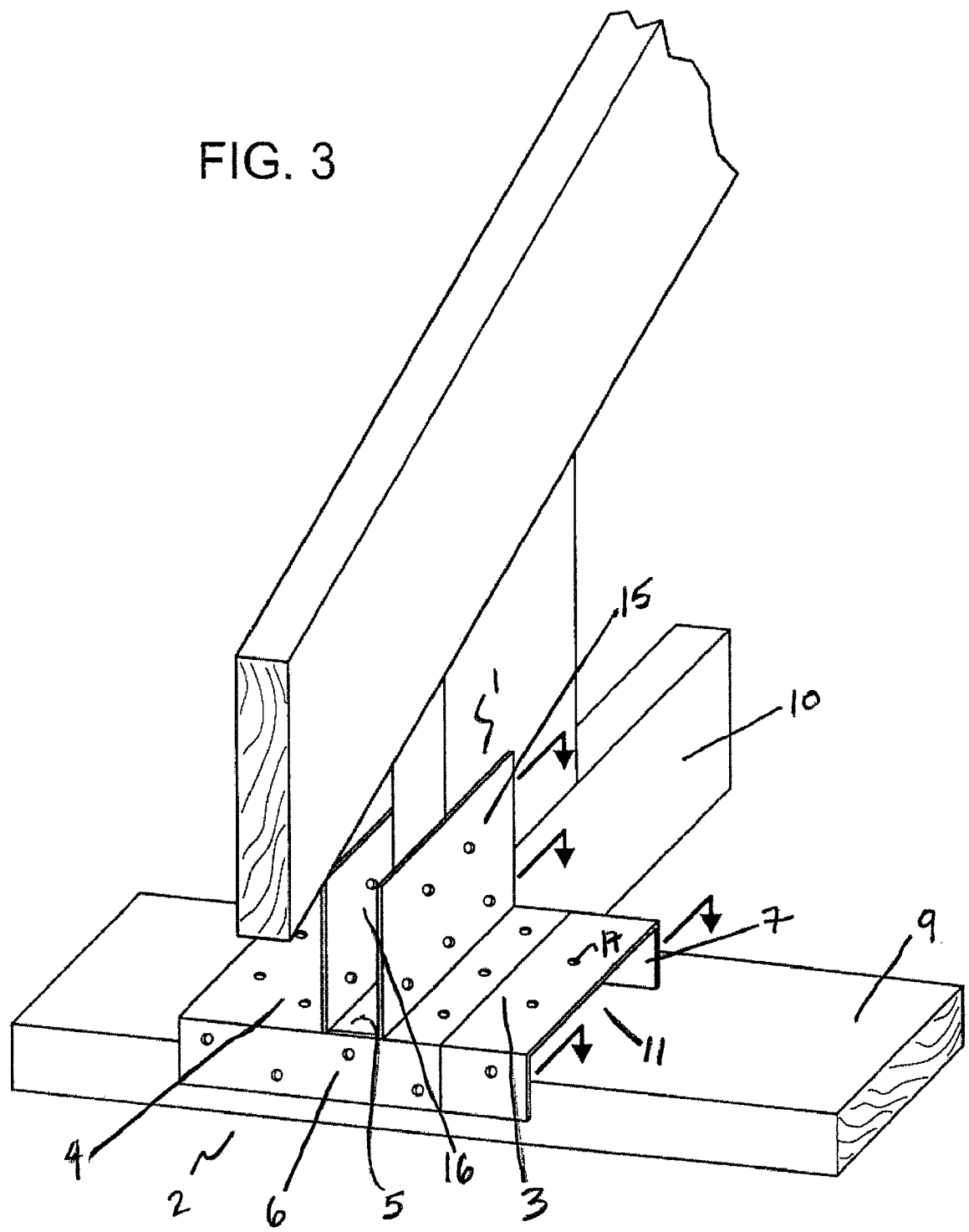
FIG. 3. shows the framing tie being positioned in place after the framing ties are affixed together.

A unitary hurricane framing tie 1 is illustrated in FIGS. 1-5.

The tie 1 includes a base 2 comprising two longitudinally spaced apart, coplanar plates 3,4. The plates 3,4 form a central first gap 5 between them. A pair of parallel side flanges 6,7 depend downwardly from the side edges of the plates 3,4. One flange 6 is continuous, whereas the other flange 7 forms a central second gap 8. The gaps 5,8 are aligned and combine to make it possible to position the tie 1 in place after the wooden framing members 9,10 have been joined. The plates 3,4 and flanges 6,7 combine to form an open-ended, three-sided first channel 11, for receiving a first framing member 9, such as a wall plate.

The central edges of the coplanar plates 3,4 are connected with and support a pair of open-ended, upwardly extending sidewalls 15. The sidewalls 15 extend transversely across the base 2 along the central edges of the coplanar plates 3,4. They form a second channel 16 that is aligned with the first gap 5, and is sized to receive the edge of the second framing member 10, such as a joist.

Figure 4:
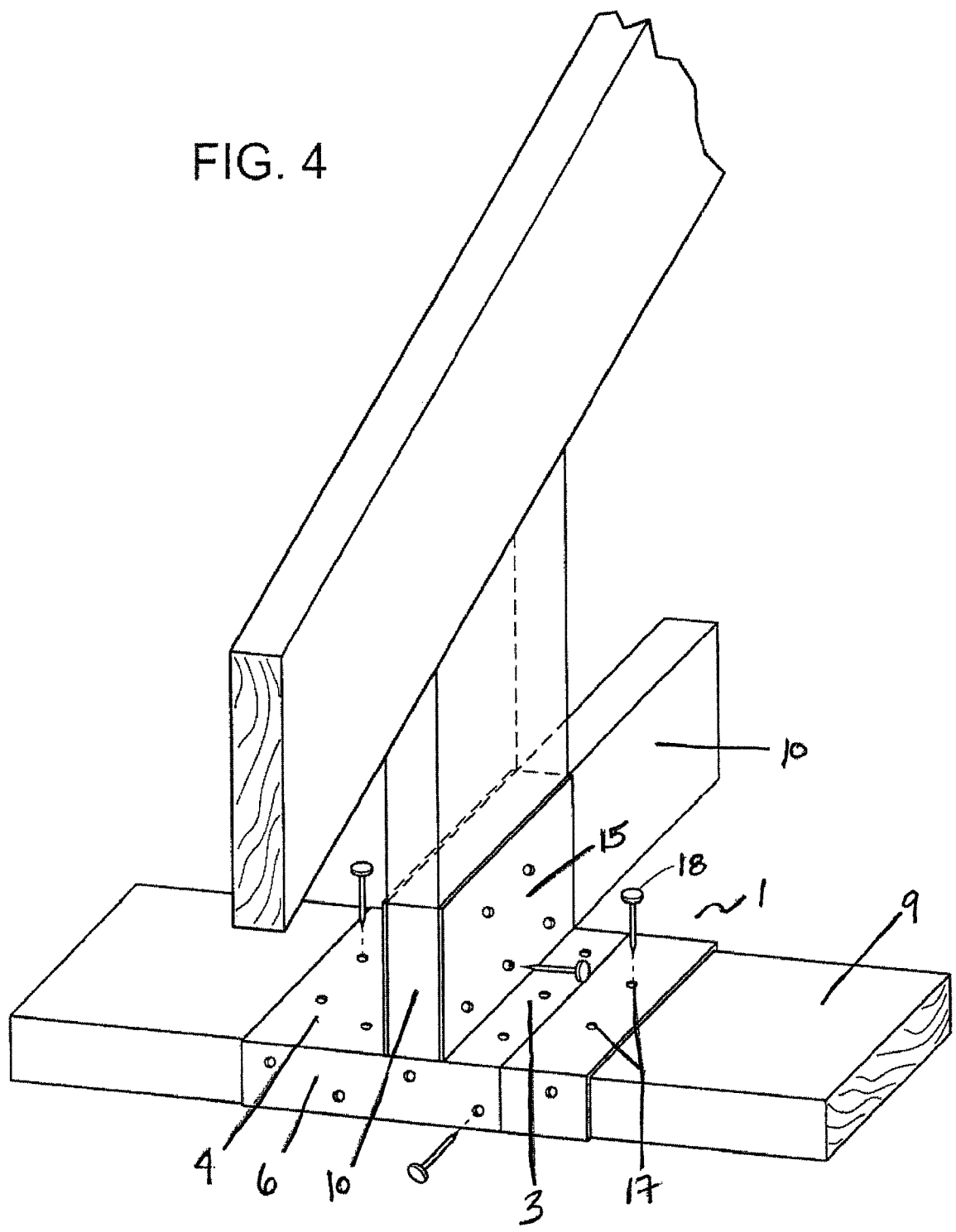
FIG. 4. shows the framing tie in place.
Figure 5:
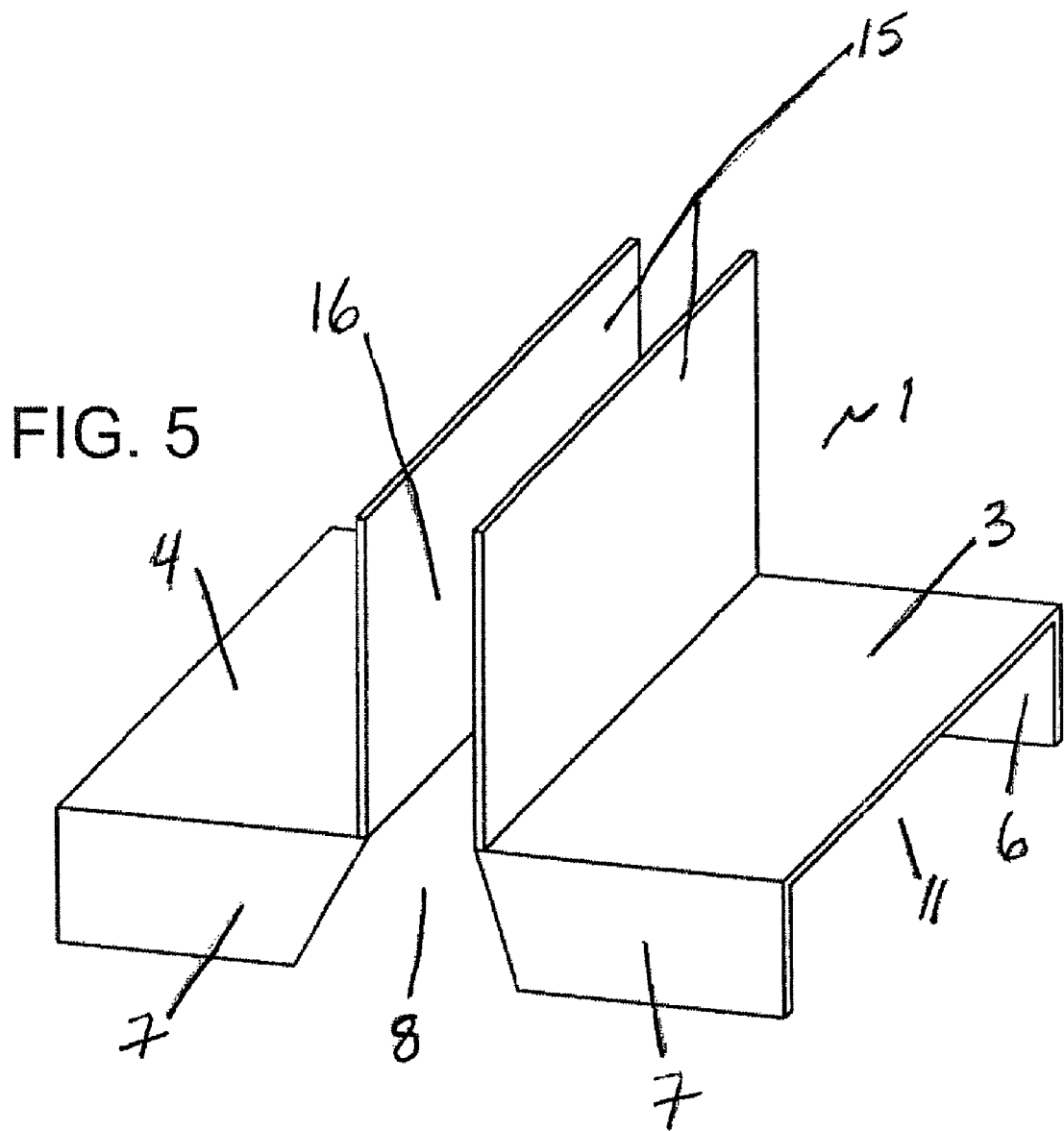
FIG. 5. shows the framing tie without apertures.

The upwardly extending sidewalls 15 extend along the margins of the first gap 5 of the base 2, such that when the second framing member 10 is positioned in the second channel 16, the edge of said framing member 10 contacts the surface of the first framing member 9, which is exposed by the first gap 5 (see FIG. 4).

The plates 3,4, flanges 6,7 and sidewalls 15 form a plurality of apertures 17 for receiving fasteners, such as nails 18. Due to the configuration of the tie 1, nails 18 can be driven at 90° into both framing members through the apertures 17. This reduces or eliminates the need for oblique "toe-nailing" and enables bilateral connection of the tie 1 with the framing members 9,10. It will be obvious to those skilled in the art that the provision of apertures is optional.

The tie 1 may be manufactured from sheet metal, galvanized steel, or another similar material. Differing gauges of steel, or other material, may be used to increase the overall strength of the tie 1. The tie 1 can be dimensional for use with single standard wooden framing members or dimensioned to received stacked members. For instance, the downward flanges 6,7 may be made longer and the sidewalls 15 may be spaced farther apart, thereby extending the overall length of the base 2, in order to accommodate stacked wooden members. These adaptations minimize the need for any manipulation of the tie 1 by the construction worker.

Any orientational or directional language used herein to describe the hurricane framing tie 1, or the configuration of the wooden framing members 9,10, are for explanatory purposes only. A person of skill in the art would appreciate that the framing tie 1 can be used in a variety of joint configurations, depending upon its location within the wood framed structure, such as in window or door frames.

Although a preferred embodiment of the present invention has been shown and described, it will be appreciated by those skilled in the art that various changes and modifications might be made without departing from the scope of the invention. The terms and expressions used in the preceding specification have been used herein as terms of description and not of limitation, and there is no intention in the use of such terms and expressions of excluding equivalents of the features shown and described or portions thereof, it being recognized that the scope of the invention is defined and limited only by the claims that follow.

The embodiments of the invention in which an exclusive property or privilege is claimed and are defined as follows:

1. A unitary framing tie, for use in securing wooden framing members together, comprising:
    a base comprising a pair of longitudinally spaced apart, coplanar plates, having side, central and terminal edges, said central edges defining a first gap, and a pair of substantially parallel, opposed flanges, downwardly depending from the side edges of the plates, whereby the base defines an open-ended three-sided first channel sized to receive a first framing member;
    one said flange extending continuously along one side edge of the plates to join them, the other said flange forming a second gap aligned with the first gap; and
    a pair of substantially parallel, opposed sidewalls, each side wall extending upwardly from the first gap along the central edges of the plates and having two side edges and a top edge to form an open-ended second channel to receive a second framing member between the side and top edges of the sidewalls.

2. The framing tie as set forth in claim 1 wherein, the upwardly extending sidewalls are substantially perpendicular to the plates.

3. The framing tie as set forth in claim 2 wherein the upwardly extending sidewalls are sufficiently spaced to receive a plurality of framing members.

4. The framing tie as set forth in claim 3 wherein the downwardly depending flanges are substantially perpendicular to the plates.

5. The framing tie as set forth in claim 4 wherein the flanges are of sufficient length to receive a plurality of framing members.

6. The framing tie as set forth in claim 5 wherein the opposed sidewalls extend opposite from, and perpendicular to, the downwardly depending flanges.

7. The framing tie as set forth in claim 6 wherein the plates, the flanges and the sidewalls comprise a plurality of apertures for receiving fasteners to affix the first framing member to the second framing member.

8. A unitary framing tie, for use in securing together two wooden framing members, comprising:
- a base comprising two coplanar side plates having central, terminal and side edges, wherein the central edges are spaced apart to form a first gap and a pair of substantially parallel opposed flanges, depending downwardly from the side edges of the plates, whereby the plates and flanges together form an open-ended three-sided first channel for receiving a first framing member;
- one said flange extending continuously along one side edge of the plates to join them, the other said flange forming a second gap aligned with the first gap; and
- a pair of upwardly extending sidewalls extending from the central edges of the plates, each sidewall having two side edges and a top edge, wherein the sidewalls form a second channel sufficiently spaced to receive a second framing member between the side and top edges;
- wherein the plates, the flanges and the sidewalls comprise a plurality of apertures for receiving fasteners.

9. The framing tie as set forth in claim 8 wherein the upwardly extending sidewalls extend in the opposite direction and substantially perpendicular to the downwardly depending flanges.

10. The framing tie as set forth in claim 9 wherein the upwardly extending sidewalls are sufficiently spaced to receive a plurality of stacked second framing members.

11. The framing tie as set forth in claim 9 wherein the downwardly depending flanges are sufficiently long to receive a plurality of stacked first framing members.

12. The framing tie as set forth in claim 1, wherein the open-ended second channel is adapted to receive the second framing member in a direction from the top edges of the sidewalls towards the base.

13. The framing tie as set forth in claim 8, wherein the second channel is adapted to receive the second framing member in a direction from the top edges of the sidewalls towards the base.

* * * * *